US010051843B2

(12) United States Patent
Lindgren

(10) Patent No.: US 10,051,843 B2
(45) Date of Patent: Aug. 21, 2018

(54) SEA LICE DOUBLE FISH PUMP

(71) Applicant: Peter B. Lindgren, Pompano Beach, FL (US)

(72) Inventor: Peter B. Lindgren, Pompano Beach, FL (US)

( * ) Notice: Subject to any disclaimer, the term of this patent is extended or adjusted under 35 U.S.C. 154(b) by 0 days.

(21) Appl. No.: 15/592,903

(22) Filed: May 11, 2017

(65) Prior Publication Data

US 2018/0184624 A1 Jul. 5, 2018

Related U.S. Application Data

(60) Provisional application No. 62/441,732, filed on Jan. 3, 2017.

(51) Int. Cl.
*A01K 61/00* (2017.01)
*A01K 61/13* (2017.01)
*A01K 79/00* (2006.01)
*A01K 63/00* (2017.01)

(52) U.S. Cl.
CPC .............. *A01K 61/13* (2017.01); *A01K 63/00* (2013.01); *A01K 79/00* (2013.01)

(58) Field of Classification Search
CPC ........ A01K 61/00; A01K 61/10; A01K 61/13; A01K 79/00
USPC .......................... 119/215, 219, 228, 232, 259
See application file for complete search history.

(56) References Cited

U.S. PATENT DOCUMENTS

| 4,743,742 A | * | 5/1988 | Espedalen | G06M 7/00 |
| | | | | 119/215 |
| 5,313,911 A | | 5/1994 | Thomassen et al. | |
| 5,450,818 A | | 9/1995 | Caillouet | |
| 6,880,485 B2 | * | 4/2005 | Massey | A01K 61/90 |
| | | | | 119/216 |
| 7,462,016 B2 | | 12/2008 | Lindgren | |
| 2008/0202998 A1 | * | 8/2008 | Tseng | A01K 63/045 |
| | | | | 210/167.21 |
| 2017/0172114 A1 | | 6/2017 | Halse | |

FOREIGN PATENT DOCUMENTS

| EP | 3114926 A1 | * | 1/2017 | ............. A01K 61/00 |
| GB | 670320 A | * | 4/1952 | ............. A01K 79/00 |
| GB | 2042641 A | * | 9/1980 | ............. A01K 79/00 |
| WO | WO9824304 | | 6/1998 | |
| WO | WO9941976 | | 8/1999 | |
| WO | WO-02078436 A1 | * | 10/2002 | ............. A01K 79/00 |
| WO | WO2005124032 | | 12/2005 | |

(Continued)

Primary Examiner — Lisa L Tsang
(74) Attorney, Agent, or Firm — McHale & Slavin, P.A.

(57) ABSTRACT

An assembly designed to encourage fish to enter a Coanda effect fish pumping system to allow delousing through the pump. The process quickly decelerates the fish in a water tank to their original speed of between 1.5 to 3 feet/second depending on pumping lift for a 10 inch diameter SILK-STREAM™ pump. As the fish guiding tube enters the tank, it is surrounded by a smooth diverging cone slowing the water speed to the original fish speed. The fish are then guided by the tubular assembly away from the water and lice into a second SILKSTREAM™ intake. The current changes within the SILKSTREAM™ Coanda effect pump provide delousing of the fish by orientating the fish in a forward direction as the fish pass through the pump.

6 Claims, 1 Drawing Sheet

(56) References Cited

FOREIGN PATENT DOCUMENTS

| WO | WO2010087722 | 8/2010 | | |
|----|--------------|--------|---|---|
| WO | WO2011099865 | 8/2011 | | |
| WO | WO2012148283 | 11/2012 | | |
| WO | WO-2014184766 A1 * | 11/2014 | ............. | A01K 61/00 |
| WO | WO20150043603 | 4/2015 | | |

* cited by examiner

SEA LICE DOUBLE FISH PUMP

PRIORITY CLAIM

In accordance with 37 C.F.R. 1.76, a claim of priority is included in an Application Data Sheet filed concurrently herewith. Accordingly, this present invention claims priority to U.S. Provisional Patent Application No. 62/441,732 entitled "SEA LICE DOUBLE FISH PUMP" filed Jan. 3, 2017. The contents of the above referenced application is incorporated herein by reference.

FIELD OF THE INVENTION

This invention relates to the fish farming industry and, more particularly, to a fish pump system constructed and arranged to remove sea lice from salmon.

BACKGROUND OF THE INVENTION

Many species of fish are farmed offshore in large net pens. One of the most popular is salmon. There is a major problem today with infestation of sea lice on farmed salmon. With the salmon industry growing rapidly, the close proximity and cross contamination makes managing sea lice on salmon challenging.

Sea lice are marine copepods of the family Caligidae, with several each of the species *Lepeophtherius* and *Caligus* species. They are a naturally occurring parasite that have existed on wild fish well before salmon farming efforts, although there is speculation that farming efforts have increased the spread of lice to wild fish. Populations of sea lice on fish are no threat to humans, but they leave marks on fish that lower market value and increase likelihood of disease. Currently, environmentalist claim that sea lice cause mortalities on salmon fingerlings returning to the ocean from rivers and, therefore, fewer fingerling survivors and fewer mature adult spawning river returns.

Treatment for sea lice infestations can take many forms in a farm environment. Several chemical treatments are currently available, the most prevalent being SLICE (Emamectin benzoate EMB). SLICE can be presented to fish through inclusion in feed. Each application technique has obvious drawbacks. Application techniques are difficult to control effective dosage, and neither have a mechanism to prevent the SLICE from entering into the environment.

Other treatments involve bathing salmon in a solution of hydrogen peroxide. It is not harmful to the environment, so it can be pumped back into the ocean. Removing high percentages of lice with hydrogen peroxide is very expensive due to the high capital cost in the form of specialized equipment. Crowding and conventional pumping can cause undue stress on the fish, leading to temporary reduced feeding and growth, degrading marks and or mortalities. Bathing fish in fresh and warm water can also be effective, but at a huge cost of energy and handling. Salmon farmers and government regulators are responding, creating huge cost increases to control the problem.

SUMMARY OF THE INVENTION

The current invention includes a process to quickly decelerate the fish in a water tank to their original speed of between 1.5 to 3 feet/second, depending on pumping lift for a 10 inch diameter SILKSTREAM™ pump. The salmon are guided by an arrangement of bars in a tubular shape, the bars being spaced to assure guiding salmon through a tank without escape from the tubular assembly. As the fish guiding tube enters the tank, it is surrounded by a smooth diverging cone, slowing the water speed to the original fish entrance speed of 1.5 to 3 feet/second. The salmon are then guided by the tubular assembly away from the water and lice into a second SILKSTREAM™ intake. The water in the tank overflows to a filtration system to separate the lice before discharging the water. The fish are deloused a second time with a SILKSTREAM™ and are then dewatered with spaced bars and returned to the cage or harvested. Water is filtered to remove and destroy sea lice prior to discharge.

An objective of the invention is to teach an efficient and effective method of removing sea lice from salmon that does not use chemicals.

Another objective of the invention is to improve lice removal from fish by pumping fish a second time during a single process.

Still another objective of the invention is to provide an exit cone for a fish transfer pump being used to remove sea lice from the host fish; the cone designed to alter the rate of water exiting the pump to create a low pressure environment capable of dislodging lice and separating the lice from the fish a distance to prevent reattachment.

Yet another objective of the invention is to decelerate fish exiting a first pump to approximately their original speed before entering a second pump to assure similar acceleration for delousing in the second pump.

Another objective of the invention is to provide a method of removing sea lice from salmon by use of two SILKSTREAM™ Coanda effect pumps.

Still another objective of the invention is to provide a transfer tube formed from spaced apart bars for directional control of fish during low current conditions.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
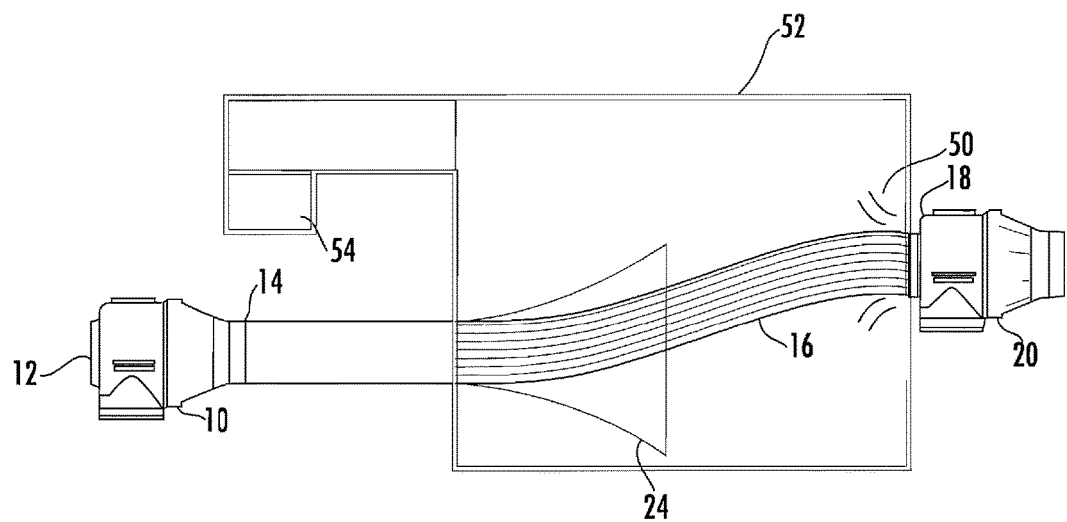
FIG. 1 is a pictorial view of a double pump sea lice removal system of the instant invention.
Figure 2:
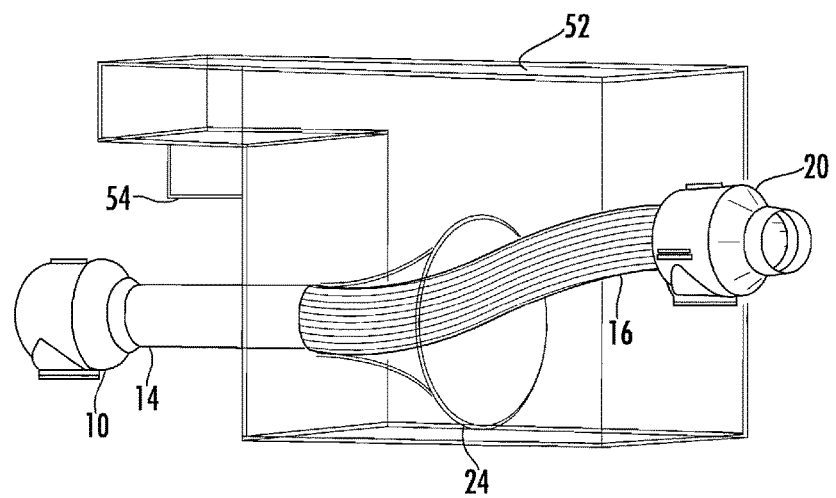
FIG. 2 is a perspective pictorial view of FIG. 1.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Fish can be transferred or "pumped" live for grading, transporting, inoculation, or any other reason by the use of specialty pumps. These pumps are typically located on boats, barges and docks, wherein large transfer hoses are used to enter into a fish holding pen or cage used to house the fish. The transfer hoses typically employ a formed cone at the suction end of the hose for ease of collecting fish. Nets may also be use to move, lift, and otherwise crowd the fish to assist in drawing the fish into the hose inlet. Fish are transferred through the hose using specialty pumps capable of moving water without an inline impeller.

Known fish transfer pumps include: SILKSTREAM™, TRANSVAC®, and MAGIC VALLEY to name a few. SILKSTREAM™ is a Coanda effect pump, described in U.S. Pat. No. 7,462,016 issued to Peter Lindgren, that does not have an inline impeller and is used for pumping larger fish in a manner that is stress free compared to previous technologies, so as to meet industry demands for the transfer of larger high quality fish. Studies performed with SILK-STREAM™ pumps have demonstrated the pump's ability to remove sea lice, notably with the Loch Duart company in Scotland. Other studies report having removed 40-70% of lice when pumping with SILKSTREAM™ while grading fish, or for other for lice treatment.

One way to improve the lice removal is to process the fish through the pump a second time, and preferably in one process. This is problematic because the primary pump powering the common 10 inch Silkstream head requires up to 2,000 GPM of primary water to create 1,000 GPM of suction water and fish. A second pump in series would require 6,000 GPM of primary water and discharge 9,000 GPM total water and fish. This is an unreasonable and inefficient quantity of water to create the required suction to pump the fish. The salmon must be decelerated to approximately their original speed before entering the second pump to assure similar acceleration for delousing in the second pump.

Referring to the Figures, the system includes the use of a first SILKSTREAM™ Coanda effect pump 10 which creates an intake suction 12 to pump live fish from a fish cage. When fish are pumped, a net within the fish cage housing is lifted and moved to crowd the fish, wherein the fish generally are sucked randomly into the pump 10. SILKSTREAM™ pumps operate using the Coanda effect that a liquid stream will follow a curved surface. The SILKSTREAM™ pump enters water to a tube concentrically at a high velocity on a curved cone surface to create inlet suction. The SILK-STREAM™ Coanda effect pump allows for the transfer of fish without any moving parts touching the fish. The transfer in this invention is to a holding tank 52 where a diverging flow can be created.

As the fish move from the intake suction 12 to the pump outlet area 14, sea lice, which are attached by being hooking to scales with a filament or with suction, are removed. Affected fish traveling head first have the lice effectively removed by a faster current flowing in a direction that will allow for the unhooking of the lice. There is an area in the SILKSTREAM™ pump where the water velocity more than doubles along the tubular surface for about 1-3 inches. Salmon being deloused will be 15 to 36 inches long, traveling essentially in the center of the accelerated water stream. The faster surface water dislodges the lice attached to the scales and skin of the salmon. SILKSTREAM™ is a Coanda effect live fish pump found to have the capability of removing up to 70% of sea lice when pumping salmon.

Sea lice develop through several life stages. During adult and sub-adult stages, the sea lice can be mobile and attach to salmon by hooking on scales or with a filament. The velocity difference created between the water and the fish during "pumping" removes sea lice. For example, the 10 inch pump commonly used on salmon requires approximately 2,000 GPM for a 2 meter lift. The inlet water to the pump will be approximately 1,000 GPM and the water stream will triple in velocity in less than 4 inches. Therefore, there is an area where the fish and the water are not at the same speed. As the fish move from the low pressure intake to the high pressure pump area, sea lice attached by hooking to scales on salmon traveling head first are effectively removed by the faster current unhooking the lice.

The process water quickly decelerates the fish in a water tank 52 to their original speed of fish movement, between 1.5 to 3 feet/second based on a pumping lift for a 10 inch diameter SILKSTREAM™ pump. The process water 50 within the water tank 52 is then separated from the fish by passing through spaced bars 16 which extend from the outlet 14 to an inlet 18 of a second SILKSTREAM™ pump 20. Excess process water 50 that enters the water tank 52 exits outlet 54, discarding the sea lice with the exiting process water. The exiting process water 50 is directed through a filtration system, not shown, to remove the sea lice prior to returning to the ocean.

The spaced bars 16 form a guiding tube structure so that the fish cannot exit the path as they are drawn to the second pump 20. The spaced bars 16 forming the wall have sufficient openings for water to flow, yet are narrow enough to prevent fish from escaping. The use of translucent spaced bars 16 are less conspicuous to the fish. The spaced bars 16 are preferably made of clear plastic, such as acrylic, polycarbonate, or the like material. A cone shaped funnel 24 provides a diverging decelerating water zone as the fish and fluid are drawn toward inlet 18 of the second pump 20. As the process water 50 exits the pump 10 along outlet 14, the cone shaped funnel 24 expands in diameter, allowing the high flow to laminar flow to move the sea lice away from the fish. Proper sizing of the spaced bars 16, and the diameter of the tunnel formed by the bars spaced 16, must be constructed and arranged to accommodate the size of fish to be pumped.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An apparatus for removing sea lice from fish, comprising:
   a water tank having a sidewall and bottom wall defining an interior area for holding water;
   a tank inlet formed in said sidewall for receiving water and fish from a first fish pump into said interior area, said first fish pump injecting water parallel to fish flow and tripling velocity of water in a length of less than 4 inches creating an area where water and fish are not moving at the same speed wherein sea lice attached to fish scales are unhooked;

a tank outlet fluidly coupled to said tank inlet by a guiding tube structure made from a series of spaced apart bars to contain and guide the fish from said first fish pump to said tank outlet;

a diverging water cone surrounding a section of said guiding tube structure, said diverging water cone having a first end positioned around said tank inlet with said diverging water cone expanding to a second end sized greater than said first end and spaced apart from said tank inlet, said diverging water cone constructed and arranged for decelerating water and fish drawn through said first fish pump to a speed between 1.5 to 3 feet/second; and a tank exit positioned above said tank outlet wherein said guiding tube structure and fish passing therethrough are fully submerged with said diverging water cone decelerating water causing unhooked sea lice to flow away from the fish and to be directed to said tank exit for removal.

2. The apparatus to remove sea lice from fish according to claim 1, wherein said first fish pump has a Coanda effect.

3. The apparatus to remove sea lice from fish according to claim 1, wherein said water tank exit is coupled to a sea lice filtration system.

4. The apparatus to remove sea lice from fish according to claim 1, wherein a diameter of said guiding tube structure is sized to prevent the fish from turning around.

5. The apparatus to remove sea lice from fish according to claim 1 including a second fish pump coupled to said water tank outlet.

6. The apparatus to remove sea lice from fish according to claim 5, wherein said second pump has a Coanda effect.

* * * * *